Sept. 4, 1951
T. J. RHODES
2,566,854
EXTRUSION CONTROL
Filed Jan. 26, 1949
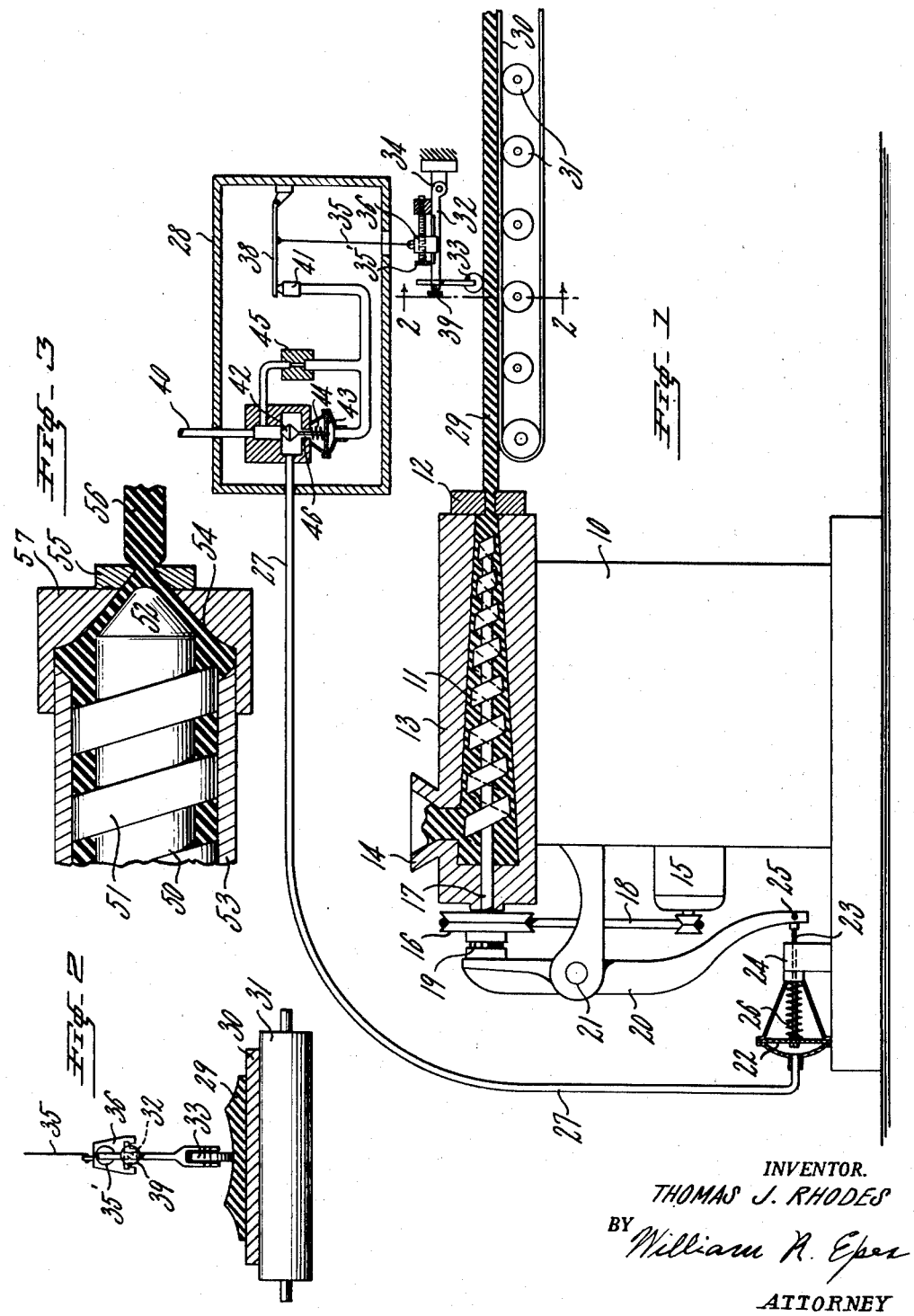
INVENTOR.
THOMAS J. RHODES
BY William R. Eper
ATTORNEY Patented Sept. 4, 1951

2,566,854

UNITED STATES PATENT OFFICE 2,566,854

EXTRUSION CONTROL

Thomas J. Rhodes, Ramsey, N. J., assignor to United States Rubber Company, New York, N. Y., a corporation of New Jersey Application January 26, 1949, Serial No. 72,989

11 Claims. (Cl. 18—12)

This invention relates to an improved method and apparatus for extruding rubber and the like, which involves changing the extrusion pressure in response to a change in a dimension of the extruded product, whereby a product having a substantially uniform transverse cross-section throughout its length is obtained while deviations from the desired rate of extrusion are maintained at a minimum.

In extruding rubber, plastics, and similar materials, it is conventional to force or squeeze the stock, usually at an elevated temperature, by means of a screw feeder, through a die having the desired shape. As the rubbery stock emerges from the die, it tends to recover elastically, that is, to increase to a size larger than the die opening. Since the magnitude of the recovery depends, among other things, on the viscosity of the stock, any change in the viscosity of the stock passing through the extruder results in a corresponding change in the dimensions of the finished product unless a compensatory change in pressure on the stock in the die opening occurs. Such changes in the viscosity of the stock may be due to various factors, such as variations of temperature in the extruder, changes in the character of the raw materials, or changes in the method of mixing the batch. The resulting changes in dimensions of the extruded article give rise to considerable wastage of material in the form of articles which are unacceptable by reason of being undersize, or in the form of articles which are unnecessarily oversize, such as preforms for molding operations, wherein the excess material is wasted as flash.

One expedient which has been used in an attempt to extrude articles of relatively constant dimensions is to vary the tension on the stock as it leaves the extruder die, by regulating the speed of travel of the article away from the extrusion orifice. Another expedient which has been used is to vary the speed of rotation of the feeding screw in the extruder. These methods have the serious disadvantage that the rate of extrusion from the nozzle orifice necessarily varies at the same time. Such variation in the extrusion rate is undesirable because it necessitates changing the rate at which material is fed to the extruder. A fairly constant rate of extrusion is also necessary for efficient and economic factory operation, which requires proper scheduling of mill mixing operations to fit the rate at which stock is consumed by the extruder, and which requires proper scheduling of molding or other operations to fit the rate of production of extruded preforms.

The principal object of the present invention is to provide a method and apparatus for extruding products of constant dimensions with a minimum of variation in the extrusion rate.

My invention comprises a controlled pressure extruder for shaping rubber and other plastic materials, having, at the entrance to the shaping die, an adjustable nozzle section, that is, a throttling means, the adjustment of which is controlled by a dimension of the extruded article. The essential parts of the extruder throttling means include a nozzle section, that is, a throat or tapered section in the extruder barrel, located immediately adjacent to the entrance to the extrusion die. Within the said throat or tapered section, there is provided a cooperating nozzle core. These two cooperating nozzle members define a throttling passageway through which the plastic stock passes from the extrusion chamber into the extrusion orifice. By moving one of these nozzle members axially relative to the other member, the area of the throttling passageway therebetween may be varied, with consequent variation in the pressure at which the stock is passed into the die. For example, in a preferred form of the invention, I employ an extruder having an adjustable feeding screw which is tapered and which rotates in a correspondingly tapered barrel. The tapered barrel serves as an outer nozzle member, while the tapered screw serves as a nozzle core adjustable within the outer nozzle member. The tapered screw and tapered barrel are employed in combination with means to detect a departure of a dimension of the shaped extruded product from a predetermined value, and associated means to vary axially the position of the tapered feeding screw in the tapered barrel in response to the detecting means. Varying the axial position of the tapered screw member with respect to the barrel results in a throttling or nozzle effect which produces a change in the pressure at which the stock is forced into the extrusion orifice, or shaping die. This change of extrusion pressure produces, in turn, a change in the recovery of the stock as it emerges from the shaping die. In this way, I am able, by controlling the extrusion pressure, to control the amount of elastic recovery of the stock on emerging from the shaping die, and by so controlling the recovery of the stock, I am able to maintain the size of the extruded article substantially constant, even though the viscosity of the stock being extruded is changing.

An apparatus embodying and adapted to demonstrate my invention is illustrated in the accompanying drawing, wherein Fig. 1 is a side elevation, partly in section, of an adjustable tapered screw extruder for tire tread, with associated dimension-measuring and screw-positioning means, shown largely diagrammatically;

Fig. 2 is a sectional view of an extruded tread taken on the line 2—2 of Fig. 1, and showing in elevation a part of the dimension-measuring means; and Fig. 3 is a side elevation in section of a portion of an extruder illustrating a modification of the invention.

With the extruder shown in the drawing, any departure of a dimension of the extruded article from the desired value results in an automatic corrective axial adjustment of the position of the extruder screw. Thus, if the viscosity of the stock passing through the extruder suddenly increases for any reason, the extruded article will begin to run over-size due to the fact that the recovery of the stock, or the increase in size of the stock on emerging from the extruder die, is relatively greater for high viscosity stock. The dimension-measuring means will detect this departure from normal size and the associated screw-positioning means will cause the tapered screw to move back slightly along its axis, thus increasing the clearance between the screw and the tapered housing. This increase in the clearance between the feed screw and the housing causes, as mentioned previously, a decrease in the pressure at which the stock is passed into the extruder die and consequently results in a decrease in the recovery of the stock as it emerges from the die. In this way the size of the extruded article is held substantially constant. Similarly, any decrease in viscosity of the stock passing through the extruder, which produces a product of smaller size, immediately causes a forward compensatory movement of the tapered screw, so that the product being extruded immediately returns to its normal size.

Turning now to the details of the apparatus, Fig. 1 of the drawing shows an extruder supported on a suitable stand 10. The extruder has a tapered feeding screw 11 for forcing stock through a die 12 having the desired shape. The feeding screw is rotatably supported within a tapered barrel or stuffer chamber 13, which has a hopper 14 at its entrance end into which the stock to be extruded is fed. The tapered feeding screw is rotated by a suitable motor 15 which is connected to a pulley 16 on the shaft 17 of the screw by a belt 18. The end of the feeding screw shaft rotates in a suitable ball thrust bearing 19 which is adapted to be moved backward and forward to change the axial position of the tapered feeding screw with respect to the tapered barrel 13. This backward and forward adjustment is imparted through an arm 20 which is attached to the supporting stand of the machine by a fulcrum 21, and which is positioned by a pneumatically actuated diaphragm 22 through a connecting rod 23 sliding in a bearing 24. The upper end of the fulcrumed arm 20 is connected to the screw shaft 17 through the thrust bearing 19, and the lower end of the arm is pivotally attached at 25 to the connecting rod 23. The diaphragm 22 acts against a compression spring 26, which resists the thrust of the screw 11 and tends to return the diaphragm to its original position as the pneumatic pressure on the diaphragm is decreased.

The pneumatic pressure which actuates the diaphragm, and thus controls the position of the tapered screw, is supplied through a pipe 27 connected to a pneumatic controller 28 which may be of any conventional construction, and which is indicated diagrammatically in the drawing. The pneumatic controller is actuated by a dimension-measuring or detecting means which is adapted to detect a change in thickness of the extruded product 29 after it emerges from the extruder die 12.

In the embodiment of the invention illustrated, the extruded product 29 is a tire tread, the cross-sectional shape of which is shown in Fig. 2. The tread is carried away from the extruder, as it is produced, by a conveyor belt 30 which rides on rollers 31 and is driven at the desired speed by any suitable means (not shown). The dimension-measuring means shown comprises a small arm 32, one end of which rides or floats on a selected part of the extruded product on a small roller 33. The arm 32 is adapted to move up or down about a fixed pivotal supporting connection 34 as the thickness of the extruded tread 29 changes. One end of a wire 35 is connected to the pivoted arm 32 through an adjustable block 36. The wire 35 supports the arm 32 and the roller 33 at a variable height depending on the position of the adjustable block 36, which is adapted to be slidably adjusted along the arm 32. The adjustable block 36 may be moved back and forth on the arm 32 by turning an adjusting screw 35' which is threaded through the block 36 for this purpose. The other end of the wire 35 is connected to a flapper valve 38, on which the arm 32 exerts more or less pressure, depending on the thickness of the tread 29. Adjustment may be made for extruding other articles of different thickness by loosening a set screw 39 on the end of the pivoted arm 32, permitting the wheel 33 to be moved up or down to the required height with respect to the arm 32. The pneumatic controller 28 is connected to a suitable constant pressure compressed air supply (not shown) through a pipe 40. When the pressure exerted on the flapper 38 through the wire 35 is relieved (as it will be if the tread begins to run over-size, thus raising the pivoted arm 32), air is permitted to escape from a nozzle 41 in the controller, thus permitting a spring loaded relay valve 42 controlled by a pneumatic diaphragm 43 to be opened by the action of a spring 44. The nozzle 41 and the pneumatic diaphragm 43 are supplied with relatively low pressure air from the main air supply tube 40 through a reducing tube 45. As the valve 42 opens, air is admitted under pressure to the connecting pipe 27, thus actuating the screw positioning diaphragm 22, which makes the desired corrective backward axial throttling adjustment of the tapered feeding screw 11 through the fulcrumed arm 20. When the tread is running over-size, the desired throttling adjustment of the tapered feeding screw is in a backward direction, in order to increase the clearance between the tapered screw 11 and the tapered barrel 13, thus reducing the pressure at which the stock is forced into the die, and consequently reducing the recovery of the stock as it emerges from the die.

The operation of my constant dimension extruder when the extruded product is running under-size is the reverse of the foregoing. The tread 29 will run under-size if stock of low viscosity is fed to the hopper 14, or if the temperature in the extruder increases. In such a case the measuring arm 32 drops down, exerting relatively greater pressure on the flapper 38 in the controller through the connecting wire 35. This restrains the air from escaping from the nozzle 41, and causes the air pressure on the pneumatic diaphragm 43 to be increased, thus closing off the relay valve 42 and hence reducing the air pressure in the connecting pipe 27 by shutting off the air supply from pipe 40 and permitting the escape of air from the pipe 27 through a bleed opening 46. This permits the pneumatic screw-positioning diaphragm 22 to be moved by the spring 26, thus moving the screw 11 forward axially in the tapered barrel 13, by means of the fulcrumed arm 20. This reduces the clearance between the tapered feeding screw 11 and tapered barrel 13, thus increasing the pressure at which the stock is passed into the die 12. This increased extrusion pressure results in a corresponding increase in the recovery of the tread 29 as it emerges from the die, thus compensating for the effect of the low viscosity of the stock, and maintaining the extruded tread at the required size.

From the foregoing, it is seen that the tapered extruder barrel 13 acts as a nozzle, and the tapered screw 11 acts as a nozzle core adjustable within said nozzle, to vary the pressure at which the rubber stock is delivered to the shaping die 12.

Small axial adjustments of the position of the tapered screw 11 in the tapered barrel 13 have only a relatively small effect on the rate at which the stock is extruded, so that my control of the dimensions of the extruded product is effected independently of great changes in the rate of extrusion.

Fig. 3 of the drawing shows a modification of the invention in which the desired pressure control, or throttling effect, is obtained by using a screw 50 which is not tapered along its threaded portion 51 but which has a torpedo head 52, that is, a tapered portion, at its delivery end. The screw 50 rotates in a barrel or cylinder 53 which has at its delivery end a tapered portion 54 corresponding to the torpedo head 52. This extruder also has a conventional die 55 for extruding a desired shaped article 56. The screw 50 is axially adjustable in a suitable manner, such as the manner described in connection with the tapered screw 11 of Fig. 1, and there is associated with the extruded article 56 a suitable dimension-detecting and controlling system, such as that shown in Figs. 1 and 2 in association with the extruded tire tread 29.

The operation of this modification of the invention is the same as the operation of the embodiment shown in Fig. 1, that is, a change in a dimension of the product 56 produces a corrective adjustment in the axial position of the screw 50. This results in a change in the clearance space between the tapered head 52 of the screw, and the tapered throat 54 of the barrel 53, thereby changing the pressure at which the stock is forced into the die 55, and consequently changing the elastic recovery of the extruded article 56 on emerging from the die.

In the modification shown in Fig. 3, instead of moving the screw 50 longitudinally to correct the size of the extruded strip 56, the tapered end 57 of the barrel 53 may be moved axially of the barrel to produce the desired change in the throttling effect on the plastic stock between the tapered portions 52 and 54. In such event, the tapered end 57 of the extruder barrel would be actuated by the arm 20 to slide in and out on the barrel 53 in response to the size detecting roller 33 in Fig. 1.

It will be thus noted that, according to the method of this invention, the pressure at which the stock is extruded is controlled by the above described nozzle or throttling action in such a manner that changes in the elastic recovery of the stock upon emerging from the die, which result from changes in the character of the stock, are immediately nulified so as to cause the cross-section of the product emerging from the die to remain substantially normal.

In order that the throttling action of the tapered screw may be effective to produce instantaneously the desired change in pressure on the stock being fed into the die, the aforesaid cooperating tapered portions of the screw and barrel should be located immediately adjacent to the entrance to the die, that is, there should be no large reservoir of rubber stock located between the tapered throttling space and the shaping die.

The feeding screw employed may be of any desired type. Screws having threads of the character described in U. S. Patent 1,392,217, which have highly positive feeding characteristics, may be used to advantage, particularly for extruding at high pressures.

While the invention has been described in detail with respect to apparatus wherein the desired extrusion pressure control is obtained by a throttling means in which the extruder feeding screw serves as the nozzle core, it will be understood that other suitable nozzle constructions may be employed. The essential requirement is that the extruder be provided with a throttling means at the entrance to the shaping die. The essential parts of the throttling means comprise a tapered nozzle-like portion of the extruder barrel or extrusion chamber, and a cooperating core member, which may be a tapered screw, or a screw with a torpedo head, or any other suitable core member, located within the said nozzle-like portion, the clearance space between the nozzle-like portion and the cooperating core being adapted to be changed to produce the desired variation in extrusion pressure.

The dimension measuring and controlling means shown in the particular embodiment of the invention which I have illustrated in detail may be replaced by their known mechanical equivalents. Thus, various photo-electric devices which are capable of detecting a change in dimensions with great accuracy, and the structure of which is well known, may be used in place of the riding measuring arm 32. In place of the pneumatic controller shown diagrammatically, other controllers, such as electronic controllers, may be used. The essential feature of this part of the invention is that the dimension-measuring means detects changes in the size of the extruded product from a desired normal, and actuates a suitable controller accordingly. The controller causes the core positioning means to make the desired axial corrective adjustment in the position of the tapered core in the tapered housing, thus varying the extrusion pressure and regulating the recovery of the extruded stock on emerging from the die, as the character of the stock passing through the extruder varies.

It is also possible to carry out the method of my invention by continually manually adjusting the clearance between the nozzle core and the tapered barrel so as to vary the extrusion pressure in response to changes in size of the extruded product.

Having thus described my invention, what I claim and desire to protect by Letters Patent is:

1. A method of extruding plastic material by passing the plastic through a die under pressure including the steps of continually measuring a dimension of the extruded product after passing from the die, and varying the pressure at which the plastic is introduced to the die inversely to a variation in the dimension of the extruded product last measured to maintain the size of the extruded product substantially constant.

2. A method of extruding plastic material by passing the plastic through a die under pressure from an extruder chamber having a throttling means at the entrance of the said die, including the steps of continually measuring a dimension of the extruded product after passing from the die and continually adjusting the said throttling means to vary the pressure at which the plastic is passed into the die inversely to a variation in the dimension of the extruded product last measured and thereby maintain the size of the extruded product substantially constant.

3. A method of extruding plastic material by passing the plastic through a die under pressure by means of a feeding screw which has a taper at least at its end portion and which rotates in a corresponding tapered barrel, including the steps of continually measuring a dimension of the extruded product after passing from the die, and decreasing the clearance between the said screw and the said barrel when said measurement indicates a decrease in the said dimension and increasing the said clearance when said measurement indicates an increase in said dimension, to maintain the size of the extruded product substantially constant.

4. A method of extruding plastic material by passing the plastic through a die under pressure by means of a feeding screw which has a taper at least at its end portion and which rotates in a correspondingly tapered barrel, including the steps of continually measuring a dimension of the extruded product after passing from the die, and axially adjusting the clearance between the tapered portion of the screw and the barrel to decrease said clearance when said measurement is undersize, and to increase said clearance when said measurement is oversize, to maintain the size of the extruded product substantially constant.

5. A method of extruding plastic material by passing the plastic through a die under pressure by means of a tapered feeding screw rotating in a tapered barrel, including the steps of continually measuring a dimension of the extruded product after passing from the die, and adjusting the relative position of said screw and barrel to decrease the clearance therebetween when said dimension is undersize, and to increase said clearance when said dimension is oversize to regulate the pressure at which the plastic is fed into the die, whereby the size of the extruded product is maintained substantially constant.

6. In an apparatus for extruding a product of uniform size, the combination of a shaping die, means for forcing plastic material under pressure into the shaping die, means for regulating the pressure at which the aforesaid means forces the plastic material into the die, means for detecting a variation in a dimension of the cross-section of the said extruded product, and means responding to said dimension-detecting means for controlling the aforesaid pressure regulating means to thereby cause the product subsequently extruded to have a normal cross-section.

7. In an apparatus for extruding a product of uniform size, the combination of an extrusion chamber having a shaping die at the discharge end thereof, means for forcing plastic material from the extrusion chamber into the die, a tapered nozzle section in said extrusion chamber at the entrance to the die, a cooperating nozzle core within the tapered nozzle section, means for varying the clearance between said nozzle core and said tapered nozzle section to regulate the pressure at which the plastic material is forced into the die, means for detecting a variation in a dimension of the cross-section of the extruded product, and means responding to said dimension-detecting means for controlling the aforesaid clearance-varying means to thereby cause the product subsequently extruded to have a normal cross-section.

8. In an apparatus for extruding a product of uniform size, the combination of a shaping die, means for forcing plastic material under pressure into the die, said means including a cooperating screw and barrel having an adjustable throttling section at the entrance to the die to regulate the pressure at which plastic material is delivered thereto, means for detecting a variation in a dimension of the cross-section of the said extruded product, and control means responsive to said dimension-detecting means for controlling the aforesaid throttling section to thereby cause the product subsequently extruded to have a normal cross-section.

9. An extrusion apparatus for extruding a product of uniform size comprising a feeding screw which has a taper at least at its end portion, a correspondingly tapered barrel in which said feeding screw rotates, a shaping die through which plastic material may be forced under pressure from the barrel by the feeding screw, means for adjusting the clearance between the feeding screw and the barrel, means for detecting a variation in a dimension of the cross-section of said product, and means responding to said detecting means for adjusting the relative position of said screw and said barrel to thereby cause said product subsequently extruded to have a normal cross-section.

10. An extrusion apparatus for extruding a product of uniform size comprising an axially adjustable feeding screw tapered at least at its end portion, a correspondingly tapered barrel in which said feeding screw rotates, a shaping die through which plastic material may be forced under pressure from the barrel by the screw, means connected to the screw for axially adjusting the position of the screw in the barrel, means for detecting a departure of a dimension of the cross-section of the extruded product from a predetermined normal, and control means responding to said dimension-detecting means for axially adjusting said screw in said barrel to thereby cause said product subsequently extruded to have a normal cross-section.

11. An extrusion apparatus for extruding a product of uniform size comprising an axially adjustable tapered feeding screw, a correspondingly tapered barrel in which said feeding screw rotates, a shaping die through which plastic material may be forced under pressure from the barrel by the screw, a pressure-actuated diaphragm connected to the screw for axially adjusting the position of the screw in the barrel, means for detecting a departure of a dimension of the cross-section of the extruded product from a predetermined normal, and a controller responding to said detecting means for translating a signal from said dimension-detecting means into a change of pressure on said pressure-actuated diaphragm, whereby a change in a dimension of the extruded product results in a corrective axial adjustment in the position of the screw in the barrel.

THOMAS J. RHODES.

REFERENCES CITED

The following references are of record in the file of this patent:

UNITED STATES PATENTS

| Number | Name | Date |
|---|---|---|
| 1,533,191 | Kaiser et al. | Apr. 14, 1925 |
| 1,989,038 | Brown | Jan. 22, 1935 |
| 2,289,933 | Rankin | July 14, 1942 |
| 2,372,162 | Ryan | Mar. 20, 1945 |
| 2,411,971 | MacMillin et al. | Dec. 3, 1946 |